Feb. 4, 1969    R. W. GUERTLER    3,425,635
FUEL INJECTION NOZZLE
Filed Feb. 15, 1967
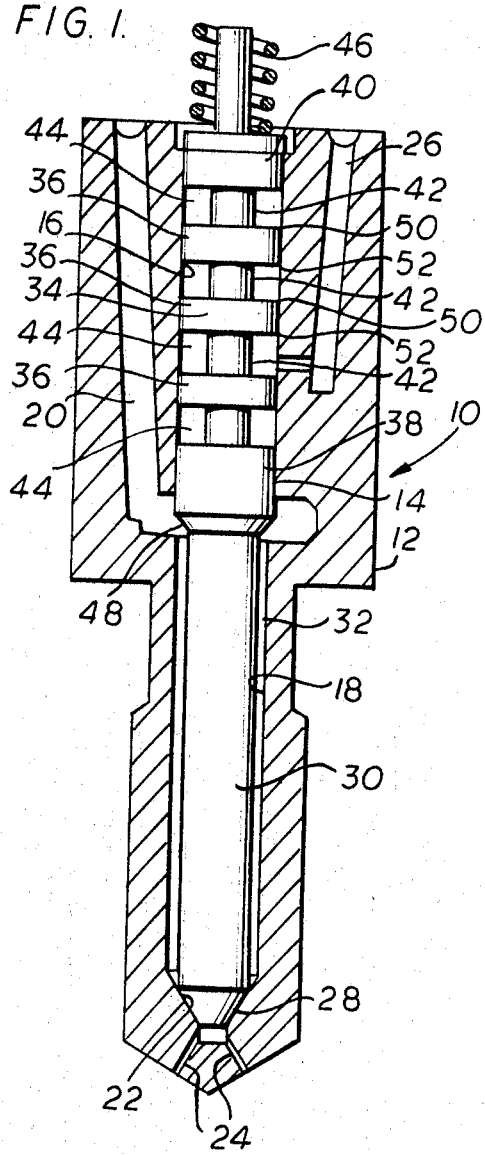
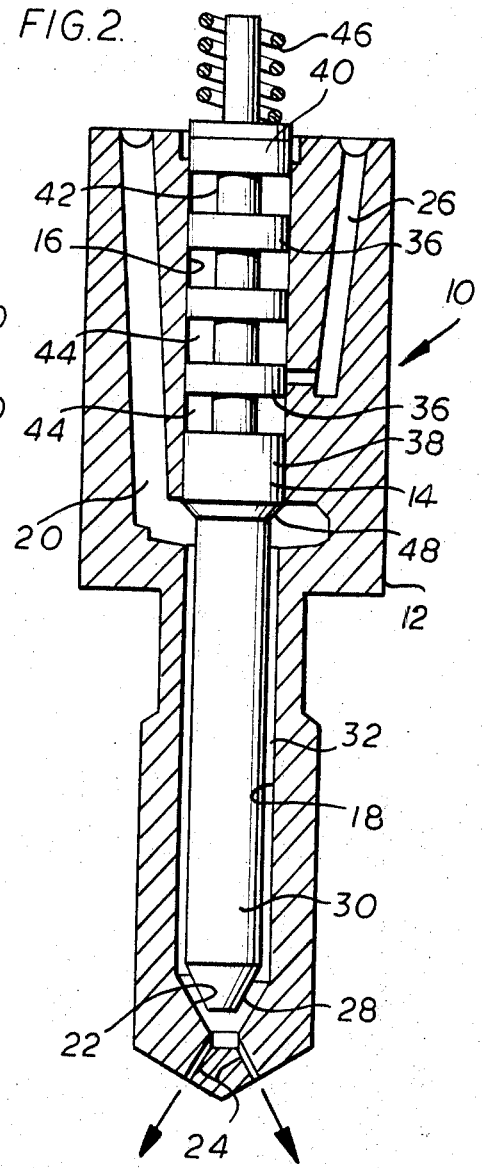
INVENTOR
RUDOLF W. GUERTLER
ATT'Y United States Patent Office 3,425,635
Patented Feb. 4, 1969

3,425,635
FUEL INJECTION NOZZLE
Rudolf W. Guertler, Fort Wayne, Ind., assignor to International Harvester Company, Chicago, Ill., a corporation of Delaware
Filed Feb. 15, 1967, Ser. No. 616,224
U.S. Cl. 239—453         5 Claims
Int. Cl. B05b 1/30, 1/32; F16k 21/10

ABSTRACT OF THE DISCLOSURE

A fuel injection nozzle wherein damping means are provided to reduce nozzle valve chattering. Means is provided for damping the valve closing motion of the needle valve by associating fluid chamber means with the needle valve so that a viscous fluid in the chamber means will dampen the motion of the needle valve during its closing movement and thereby reduce the bouncing of the needle valve and the attendant undesirable injection.

---

This invention relates to fuel injection nozzles and more particularly to a means for reducing the bounce of a needle valve in the nozzle.

Fuel injection nozzles operating on the differential pressure principle usually have a movable nozzle needle valve positioned in a nozzle body and held down against a conical nozzle seat of the nozzle body by a spring. Fuel may be introduced through a duct into the lower section of the nozzle body. As the fuel pressure increases, the fuel forces the needle valve to open against the spring force. As fuel pressure decreases, the spring forces the needle to rest on its seat.

During the fuel pressure decrease period, which is the end of the injection period, the needle valve hits the seat with considerable force, causing it to bounce and allowing fuel to enter the combustion space after the end of the injection period. The fuel entering the combustion space in this way is called "dribbling." That this is a real problem is indicated by the fact that tests show that sometimes this "dribbling" represents as much as 5% of the injection quantity. It has been determined that this "dribbling" sometimes lasts for as long as 100 degrees after the end of the designed injection period.

The dribbling fuel enters the combustion chamber at or after the peak of the main combustion during a period of high temperatures and pressures in the cylinder. This dribbling fuel is not atomized but consists of relatively large liquid droplets. It can readily be appreciated that such a condition helps to create smoke, adversely affects the efficiency and power of the engine with which the injector device is associated, and reduces the life of the fuel injector itself.

Accordingly, it is a principal object of this invention to provide an improved fuel injector device which will be effective to make more efficient use of the fuel supplied to the engine with which the injector is associated.

Another object is to provide in a fuel injector device a needle valve damping means which will reduce undesirable bouncing of the needle valve on its seat.

A further object of this invention is to provide a damping means for a needle valve of a fuel injector device which includes chamber means disposed between the needle valve and the valve body in which the needle valve is disposed, such chamber means being adapted to contain fluid damping medium such as oil.

Still another object is to provide a damping means for a needle valve of a fuel injector device which includes groove means formed on the outer periphery of the needle valve for containing the damping medium.

Another object is to provide a needle valve damping means which utilizes lubricating oil as a damping medium fluid.

The above and other objects and advantages of the invention will be more readily apparent when read in conjunction with the accompanying drawings in which:

FIGURE 1 is a sectional view in elevation of a fuel injection nozzle showing a needle valve in a nozzle body in a closed position;

FIGURE 2 is a sectional view in elevation of a fuel injection nozzle as shown in FIGURE 1 but showing the valve in its open position.

Referring now to the drawings wherein like reference characters on the different views identify similar parts, the device shown in FIGURE 1 represents a fuel injection nozzle 10 which comprises a needle valve body 12 and a needle valve 14. The valve body 12 has a longitudinally extending bore 16 formed in the upper portion thereof in which the needle valve 14 is disposed for longitudinal reciprocation. A close sliding fit exists between the needle valve 14 and the bore 16. A second and smaller bore 18 is formed in the lower portion of the valve body 12 to accommodate the lower portion of the needle valve 12. A fuel passage 20 adapted to be connected to a source of fuel under pressure is also formed in the valve body 12 and is here shown as being formed in the upper portion of the valve body. A conical valve seat 22 is formed in the valve body 12 at the lower end of the bore 18. One or more nozzle orifices 24 are formed in the lower end of the valve body 12 and communicate with the lower end of bore 18. A second passage 26 is formed in the upper portion of the valve body 12 and is disposed to communicate with the bore 16 and its purpose will be more fully explained.

The needle valve 14 has a conical surface 28 formed on the lower end thereof to seat on the valve seat 22. The lower end 30 of the needle valve 14 has a diameter slightly smaller than the bore 18 so that a circumferential fuel passage 32 is formed between the needle valve lower end 30 and bore 18. This passage 32 establishes communication between the fuel passage 20 and the nozzle orifice 24 when the needle valve 14 is unseated as shown in FIGURE 2.

The upper portion 34 of the needle valve 14 has formed thereon a plurality of lands 36 which together with the extreme ends 38 and 40 of the upper portion 34 of the needle valve define a plurality of grooves 42 in the upper portion of the needle valve. These grooves 42 with the adjacent part of the bore 16 define a plurality of chambers 44 for holding a damping fluid to suppress needle valve bounce during operation of the fuel injection device 10. The lands 36 and the extreme ends 38 and 40 of the upper portion of the needle valve form a close sliding fit with the bore 16. It is contemplated that the damping fluid will be a high viscosity oil such as a lube oil, for example, which is introduced into the chambers 44 under pressure through the passage 26 from a pressurized lube oil source (not shown). This may be lube oil from the engine. It enters one of the chambers 44 directly and then seeps into the other chambers through the small clearance between the lands 36 and the bore 16. Additional branch passages could be provided which extend from the main passage 26 to more than one of the chambers 44.

The shape of the grooves 42 may take on a variety of forms, and while the embodiment hereon disclosed has four grooves, the number of grooves may be varied. For example, only one circumferential groove may be formed in the needle valve to provide one large chamber to hold the damping medium.

While the chambers 44 for accommodating the damping fluid are here shown as being defined by grooves formed in the needle valve, it is apparent that such grooves might well be formed in the valve body or partially in the valve body and partially in the needle valve.

FIGURE 1 shows the needle valve 14 in its normally closed or seated position, the valve being held in that position by a spring 46 in a conventional manner as is well known in the art. FIGURE 2 shows the needle valve 14 forced into its open position against the pressure of spring 46 by pressurized fuel in the passage 20 acting against the underside 48 of the upper portion of needle valve 14.

The oil in the chambers 44 provides a damping influence due to the shearing friction set up between the oil and the outer edges 50 and 52 associated with the lands 36 on the needle valve. Furthermore, as the needle valve 14 reciprocates, considerable turbulence is created in the damping medium with each injection cycle. This has additional damping effects.

The operation of the fuel injection nozzle 10 may be briefly summarized as follows. When fuel from a fuel injection pump (not shown) is supplied under pressure to the fuel injection nozzle 10, the fuel pressure in the passage 20 acts on the underside 48 of the needle valve 14 lifting it from its seat 22 against the force of the spring 46. The fluid in the chambers 44 functions as a damping medium whereby the full force of the spring 38 is not permitted to take effect. Without the damping effect of the fluid in chambers 44, the spring 38 would attempt to snap the needle valve back onto its seat resulting in a bouncing of the needle valve which permits the objectionable "dribbling". The damping fluid, however, supplies resistance in the nature of shearing friction forces as well as turbulence within the chamber due to the rapid oscillation of the needle valve.

Thus it will be apparent that I have advantageously provided a fuel injection nozzle constructed in a manner to utilize a fluid damping means for the nozzle needle valve. This has the advantage of reducing undesirable dribbling of fuel after the injection period has passed, increasing the efficiency of engine performance, reducing smoke resulting from unburned products of combustion, and prolonging the life of the needle valve.

While a specific embodiment of the invention has been illustrated and described, it is to be understood that the invention is not limited thereto as other variations will be apparent to those skilled in the art and in the invention is to be given its fullest possible interpretation within the terms of the following claims.

I claim:

1. A fuel injector device for an engine having a source of fuel under pressure and a pressurized lubricating oil system, comprising, a valve body having a longitudinally extending bore formed, one end of said bore being in fluid communication with said source of fuel under pressure and the opposite end being in fluid communication with outlet orifice means; valve means for controlling the flow of fuel from said bore through said outlet orifice means including a valve seat formed in said valve body at the junction of said bore and outlet orifice means and an elongated needle valve having a section disposed within said bore, said needle valve being movable with respect to said valve body between a closed position wherein one end of said needle valve operatively engages said valve seat and an open position wherein fluid communication between said bore and outlet orifice means is established upon the attainment of a predetermined fuel pressure in said bore; biasing means yieldably urging said needle valve to said closed position; and viscous dampening means operatively associated with said needle valve for restraining movement of said needle valve from said closed position to said open position when the fuel pressure in said bore is below said predetermined pressure including substantially enclosed chamber means sealed with respect to said bore, an enlargement carried by said needle valve slidable within said chamber means, and means for introducing pressurized lubricating oil from said lubricating oil system into said chamber means.

2. A fuel injector device as set forth in claim 1, wherein the longitudinal axis of said chamber means is in alignment with the longitudinal axis of said bore, and said enlargement carried by said needle valve is reciprocable along the longitudinal axis of said chamber means.

3. A fuel injector device as set forth in claim 2, wherein said chamber means includes an elongated second bore having one end adjacent a respective end of said first mentioned bore, and said means for introducing pressurized lubricating oil from said lubricating oil system into said chamber means includes passage means provided in said valve body in fluid communication with said lubricating oil system and having one end opening into said second bore intermediate its ends.

4. A fuel injector device as set forth in claim 3, wherein said enlargement is provided with a plurality of longitudinally spaced, annular grooves, the groove surfaces partially defining said chamber means.

5. A fuel injector device as set forth in claim 4, wherein said enlargement is an integral part of said needle valve and wherein said biasing means includes a helically-wound compression spring disposed exteriorly of said chamber means and has one end bearing against a free end face of said needle valve.

References Cited

UNITED STATES PATENTS 2,901,185   8/1959   Dickey _____ 239—453

M. HENSON WOOD, JR., *Primary Examiner.*

M. Y. MAR, *Assistant Examiner.*

U.S. Cl. X.R.

123—32; 137—514; 239—533, 584